United States Patent [19]
Pywell et al.

[11] Patent Number: 5,829,841
[45] Date of Patent: Nov. 3, 1998

[54] INFLATABLE SEAT BELT TENSIONER

[75] Inventors: James Frederick Pywell; Gerald John Keller, both of Shelby Township, Macomb County, Mich.

[73] Assignee: General Motors Coporation, Detroit, Mich.

[21] Appl. No.: 991,508

[22] Filed: Dec. 16, 1997

[51] Int. Cl.$^6$ .................................................. B60R 22/28
[52] U.S. Cl. ........................................... 297/471; 297/483
[58] Field of Search ........................... 297/216.1, 216.12, 297/216.13, 483, 471, 472, 473, 391, DIG. 3; 280/730.2, 728.1, 733, 808, 748

[56] References Cited

U.S. PATENT DOCUMENTS

| | | |
|---|---|---|
| 3,866,975 | 2/1975 | Fricko . |
| 3,879,054 | 4/1975 | Lindblad . |
| 3,888,503 | 6/1975 | Hamilton . |
| 3,982,775 | 9/1976 | Lindblad . |
| 4,223,916 | 9/1980 | Tillac . |
| 4,232,886 | 11/1980 | Tsuge et al. . |
| 4,946,191 | 8/1990 | Putsch . |
| 5,303,953 | 4/1994 | Kamiyama et al. . |
| 5,354,096 | 10/1994 | Tanaka et al. . |
| 5,383,713 | 1/1995 | Kamiyama et al. . |
| 5,393,091 | 2/1995 | Tanaka et al. . |
| 5,465,999 | 11/1995 | Tanaka et al. . |
| 5,466,002 | 11/1995 | Tanaka et al. . |
| 5,474,326 | 12/1995 | Cho . |

*Primary Examiner*—Milton Nelson, Jr.
*Attorney, Agent, or Firm*—Kathryn A. Marra

[57] ABSTRACT

A vehicle seat belt installation has a structural belt guide mounted on the seat back headrest which guides movement of the seat belt during operation between a clamping member and a clamping surface. A normally deflated inflatable bag includes a body that is mounted on a base having an inextensible fixed length with one end fixed to the structural belt guide. The other end of the bag base mounts an end belt guide loop which embraces the belt. A middle belt guide loop is secured to the bag outer surface embracing the belt to assure that occupant movement causes the belt to move along a travel route over the outer surface of the bag a distance that is substantially equal to said fixed length when the bag is deflated. When sudden vehicle deceleration is sensed, an inflator mounted in the headrest simultaneously moves the clamping member to clamp the belt to the clamping surface against movement and inflates the bag. Bag inflation balloons the belt travel route between the ends of the bag base into a distance substantially greater than fixed base length, which tensions the seat belt and secures the seat occupant in the seat.

6 Claims, 5 Drawing Sheets

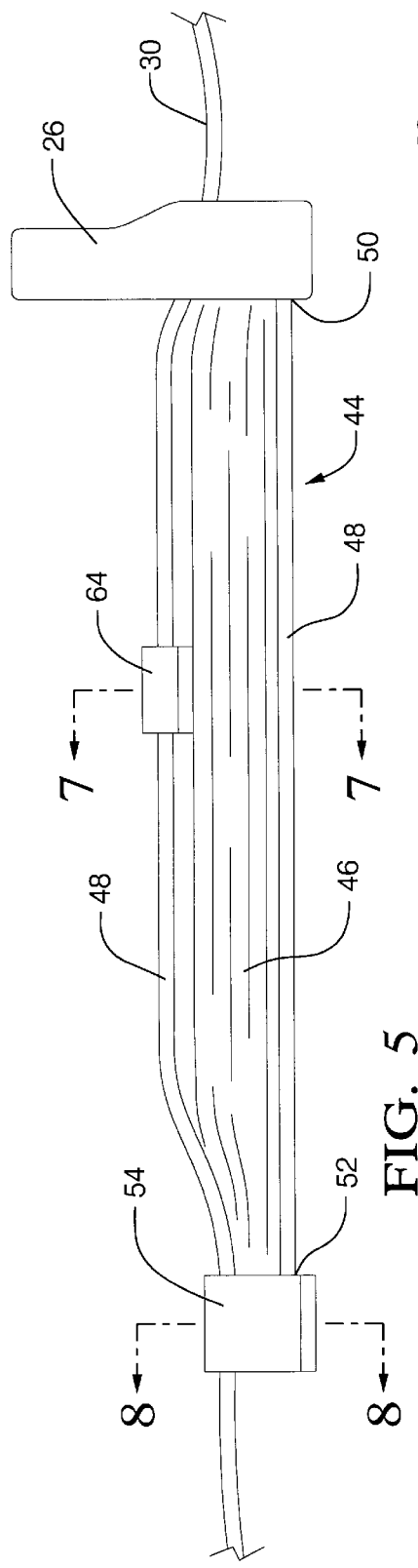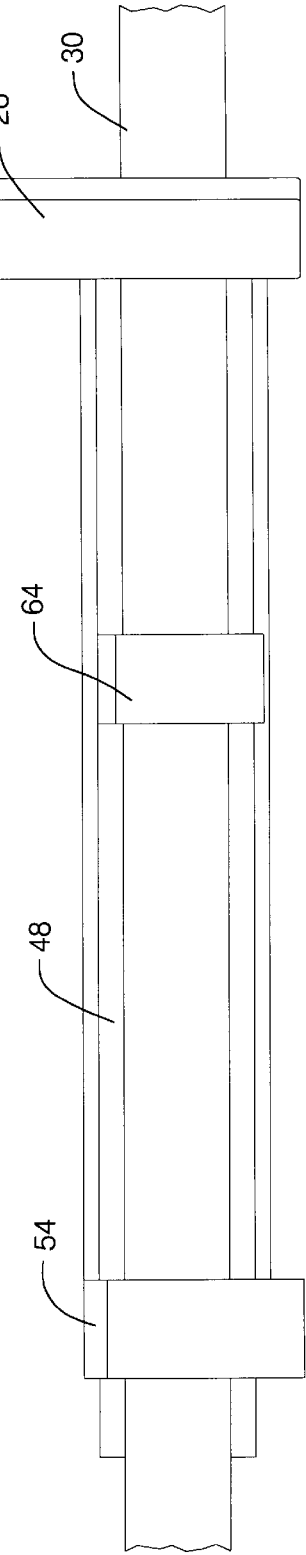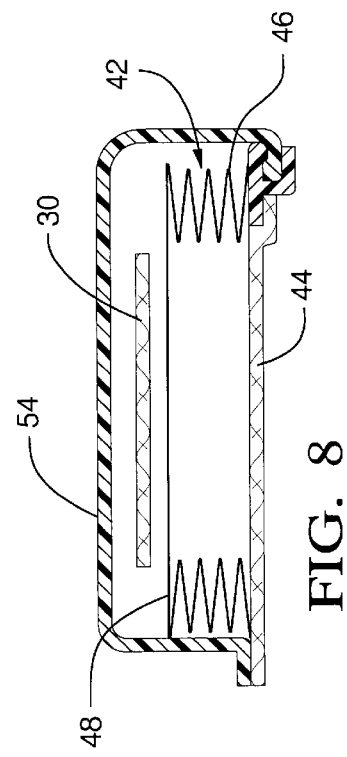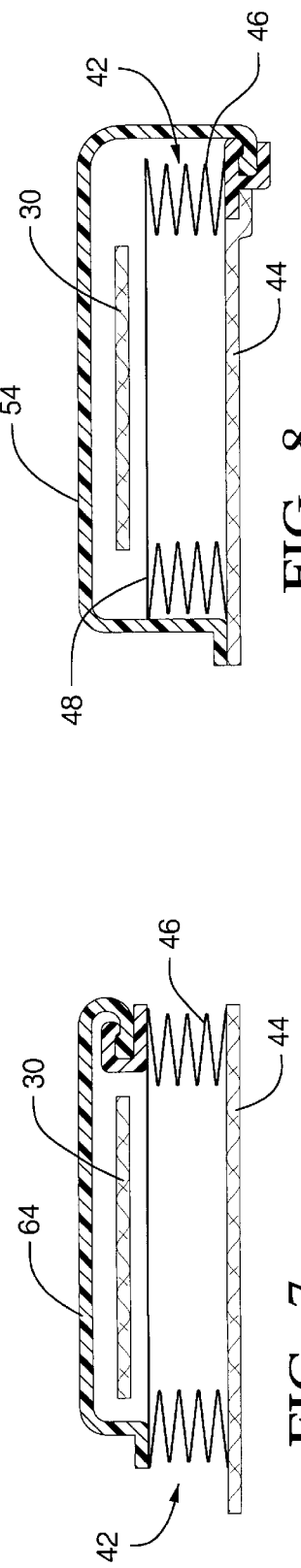

INFLATABLE SEAT BELT TENSIONER

TECHNICAL FIELD

This invention relates generally to vehicle seat belts and, more particularly, to an inflatable device for tensioning a seat belt.

BACKGROUND OF THE INVENTION

Many seat belt restraints (i.e. seat belt comprising shoulder and lap belts segments) are designed to enable the occupants to move about in their seats. This requires the seat belt to move in and out of the retractor against a retracting spring force to extend and retract the belt as required by occupant movement. However, these retractors automatically lock to secure the occupant in the seat when a predetermined sudden vehicle positive or negative acceleration (i.e. acceleration or deceleration) is sensed.

Many devices have been proposed to initially retract the seat belt, or "pretension" the belt. These devices require the addition of a retraction motor, electrically-actuated squib or other power source to power this retraction.

Another pretensioning method that has been proposed is the provision of a seat belt with an integral inflatable segment or air bag which inflates as the belt is locked by the retractor. In one version, this effectively shortens the belt; in another, the bag expands between the belt and occupant to force the occupant into the seat back. These devices require a hybrid belt construction that is expensive since it must be specially designed for each installation.

It would be desirable to provide a seat belt tensioner that is simple and can be adapted for use with any existing seat belts.

It would also be desirable to provide a seat belt tensioner that also provides occupant side head protection.

SUMMARY OF THE INVENTION

It is therefore an object of this invention to provide a belt tensioner that is simple and can be adapted for use with any existing seat belt.

It is another object of this invention to provide a seat belt tensioner that also provides occupant side head protection.

In one aspect, this invention features a vehicle occupant seat belt installation having a seat belt movable during operation through a vehicle seat-mounted structural belt guide. Clamping means mounted on the guide are operable to clamp the belt against movement through the guide. A normally deflated inflatable bag includes a body with an outer surface and a base having an inextensible fixed length, with one end fixed to the structural belt guide and the other end mounting an end belt guide which embraces the belt. An intermediate belt guide is mounted on the bag outer surface and cooperates with the structural belt guide and the end belt guide to assure that movement of the belt is along a travel route over the outer surface of the bag a distance that is substantially equal to said fixed length when the bag is deflated. An inflator is operable upon detecting a threshold vehicle deceleration to simultaneously operate the clamping means to clamp the belt against movement and to inflate the bag. Upon inflation, the bag balloons the belt travel route between the ends of the bag base into a distance substantially greater than said fixed length to tension the seat belt and secure the occupant in the seat.

Preferably, the end guide means are a guide loop mounted in the base and the intermediate guide means is a guide loop secured to the outer surface of the bag.

In another aspect of this invention, the seat belt has shoulder and lap belt portions, and the vehicle structural belt guide is mounted on a seat back headrest, with the inflatable bag having a flexible base extending forwardly of the headrest along the shoulder belt portion, adjacent the seat occupant's head, thereby providing ancillary side head protection in the event of vehicle side impact. Preferably, the inflator is mounted in the headrest and inflates the bag within 15–22 msec. of threshold deceleration detection.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 5 is a side view of the inflatable seat belt tensioner of this invention;

FIG. 6 is a top view of the inflatable seat belt tensioner of FIG. 5;

FIG. 7 is a sectional view, taken along line 7—7 of FIG. 5;

FIG. 8 is a sectional view, taken along line 8—8 of FIG. 5;

DETAILED DESCRIPTION OF A PREFERRED EMBODIMENT

Figure 1:
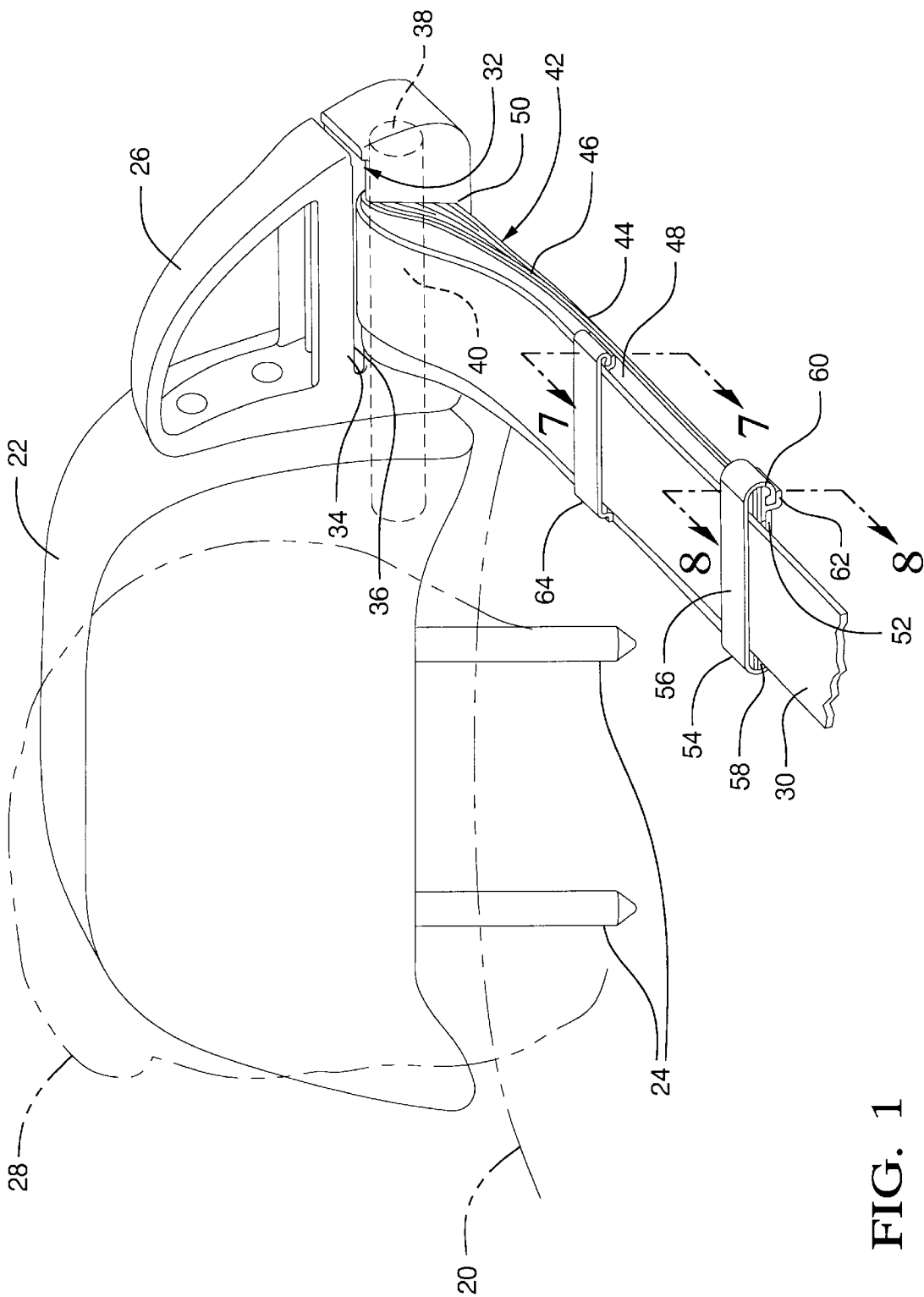
FIG. 1 is a partial perspective view of a seat belt installation employing a structural guide and an inflatable seat belt tensioner according to this invention, with the bag shown in uninflated condition.
Figure 9:
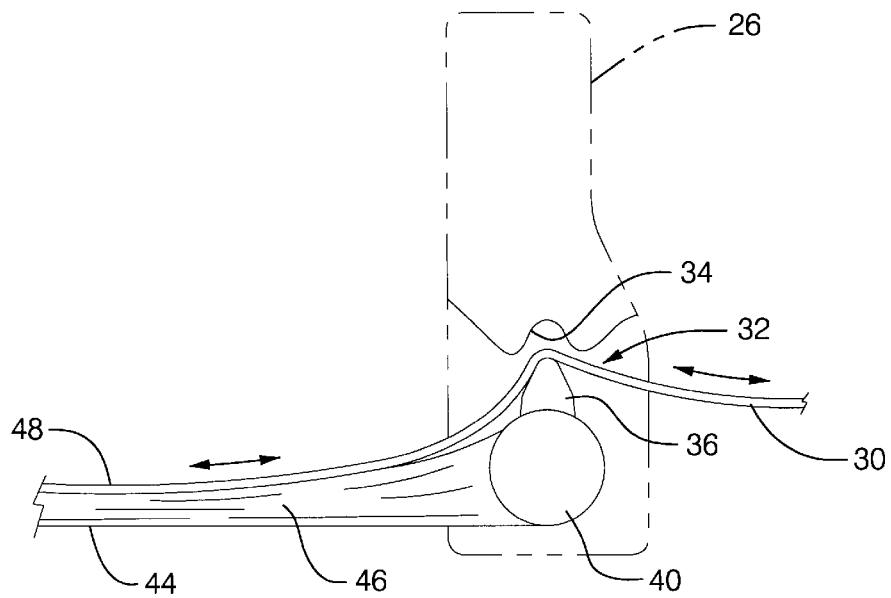
FIG. 9 is a side view showing seat belt movement through the structural guide when the inflatable bag is uninflated.

Referring now to FIG. 1 of the drawings, an automobile seat 20 mounts a headrest 22 on two rods 24. A structural seat belt guide 26 is secured to headrest 22 to the side and rear of a seated occupant 28. The shoulder belt portion of a seat belt 30 extends through a slot 32 in seat belt guide 26 between a clamping surface 34 and a clamping member 36. As is conventional, during normal automobile operation, movement of occupant 28 in seat 20 will cause seat belt 30 to move through slot 32, as shown in FIG. 9, under the bias of a seat belt retractor, not illustrated.

Figure 2:
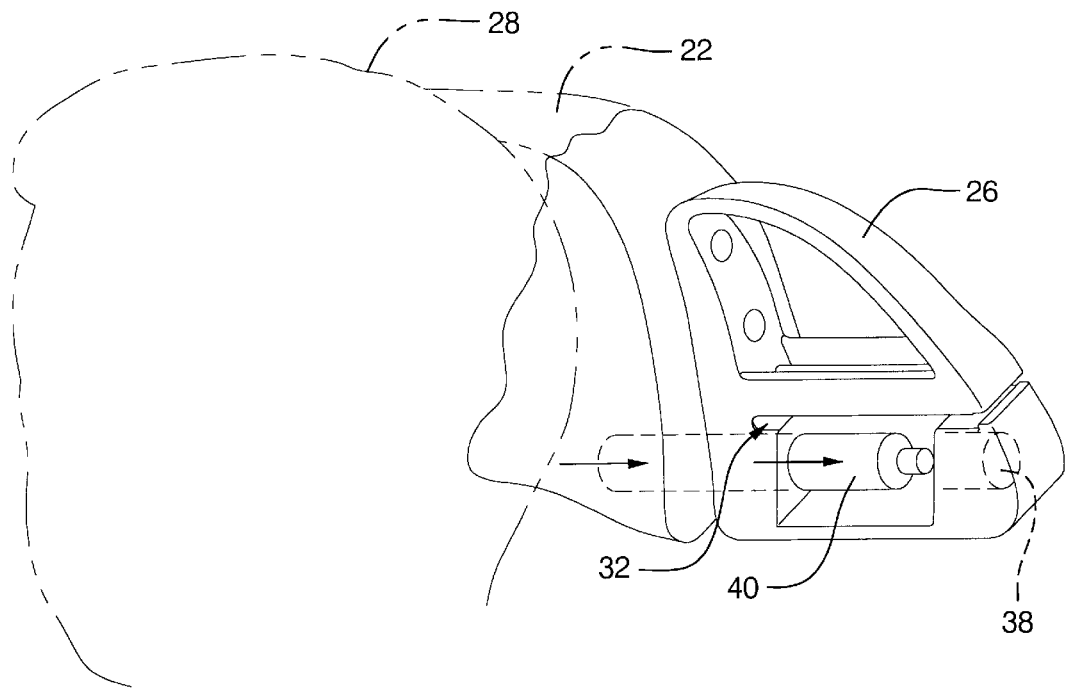
FIG. 2 is a partial view similar to FIG. 1, broken away to show the details of the inflator location.
Figures 3, 4:
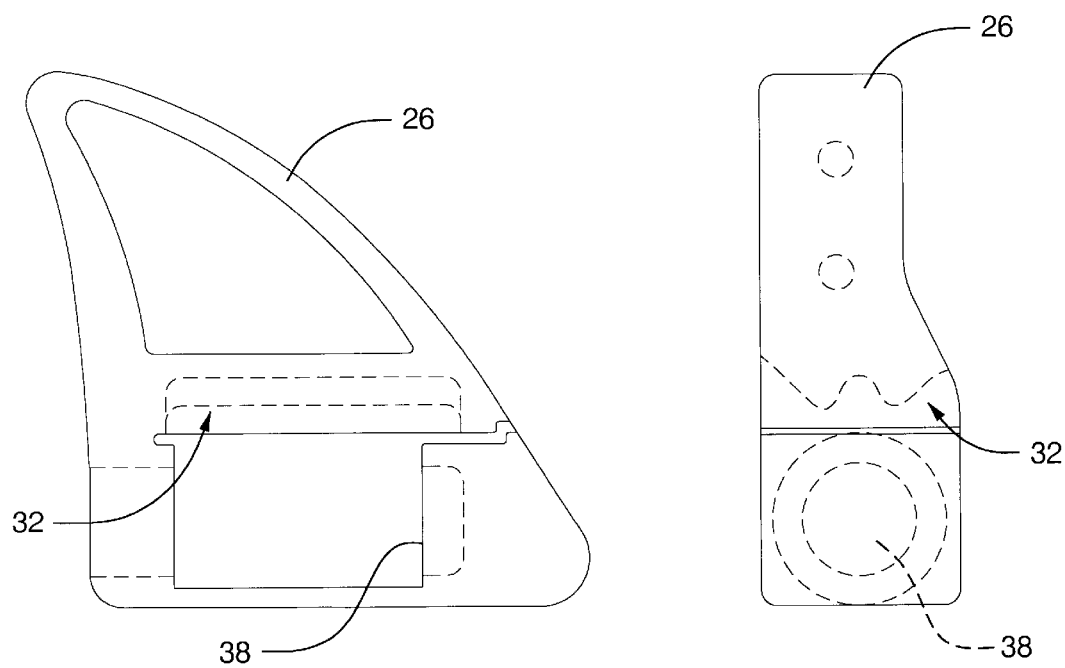
FIG. 3 is a front view of the structural guide of this invention.
FIG. 4 is a side view of the structural guide of FIG. 3.

Referring to FIGS. 2–4, seat belt guide 26 includes a cavity 38 which receives an inflator 40, such as a 60 Kpa hybrid inflator. An inflatable bag 42 made of conventional nylon vented airbag material, has a flexible base or tension member 44 made of multifolded material, triple-stitched for strength, and a folded body 46 that includes an upper surface 48. At its inner end 50, bag base 44 is secured to seat belt guide 26, and bag body 46 is in fluid communication with inflator 40.

At its outer end 52, bag base 44 mounts a seat belt routing loop or guide 54, which embraces seat belt 30, as shown in FIGS. 1, 5, 6 and 8. Guide 54 comprises a plastic J-clip 56 that has one end 58 sewn to bag base 44, and its free end 60 latched to a plastic latch member 62 which is sewn to bag base 44. A similar plastic intermediate guide 64 is similarly sewn to upper bag surface 48 to embrace seat belt 30, as shown in FIGS. 1, 5, 6 and 7.

Guides 54 and 64 are initially opened to admit seat belt 30 and then latched to assure that seat belt 30 is confined to travel along a route over bag 48 top surface, as best seen in FIGS. 1, 5 and 6. During normal vehicle operation, movement of occupant 28 about seat 20 will cause seat belt 30 so slide in and out of its retractor along a route over the top surface 48 of inflatable bag 42, as constrained by guide loops 54 and 64. If sudden vehicle acceleration is detected, inflatable bag 42 will inflate and deploy as follows.

Figure 11:
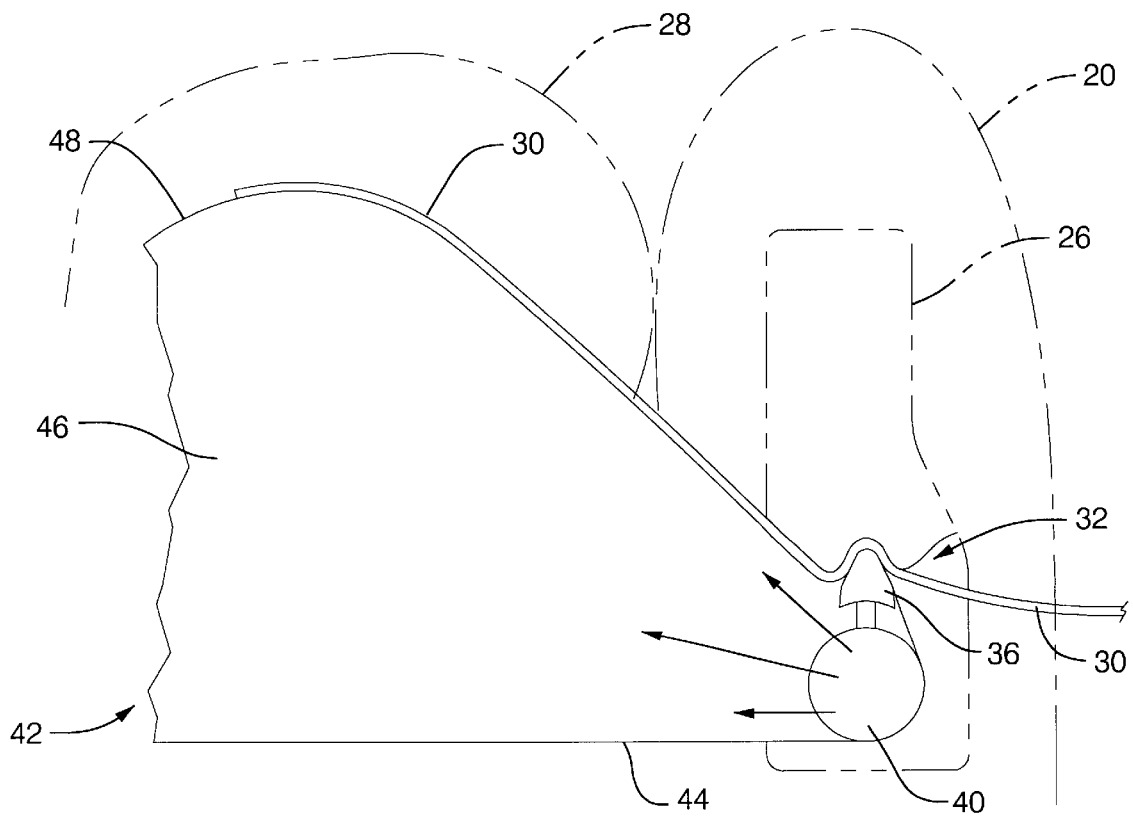
FIG. 11 is a view similar to FIG. 9, showing clamping of the belt and bag inflation.
Figure 10:
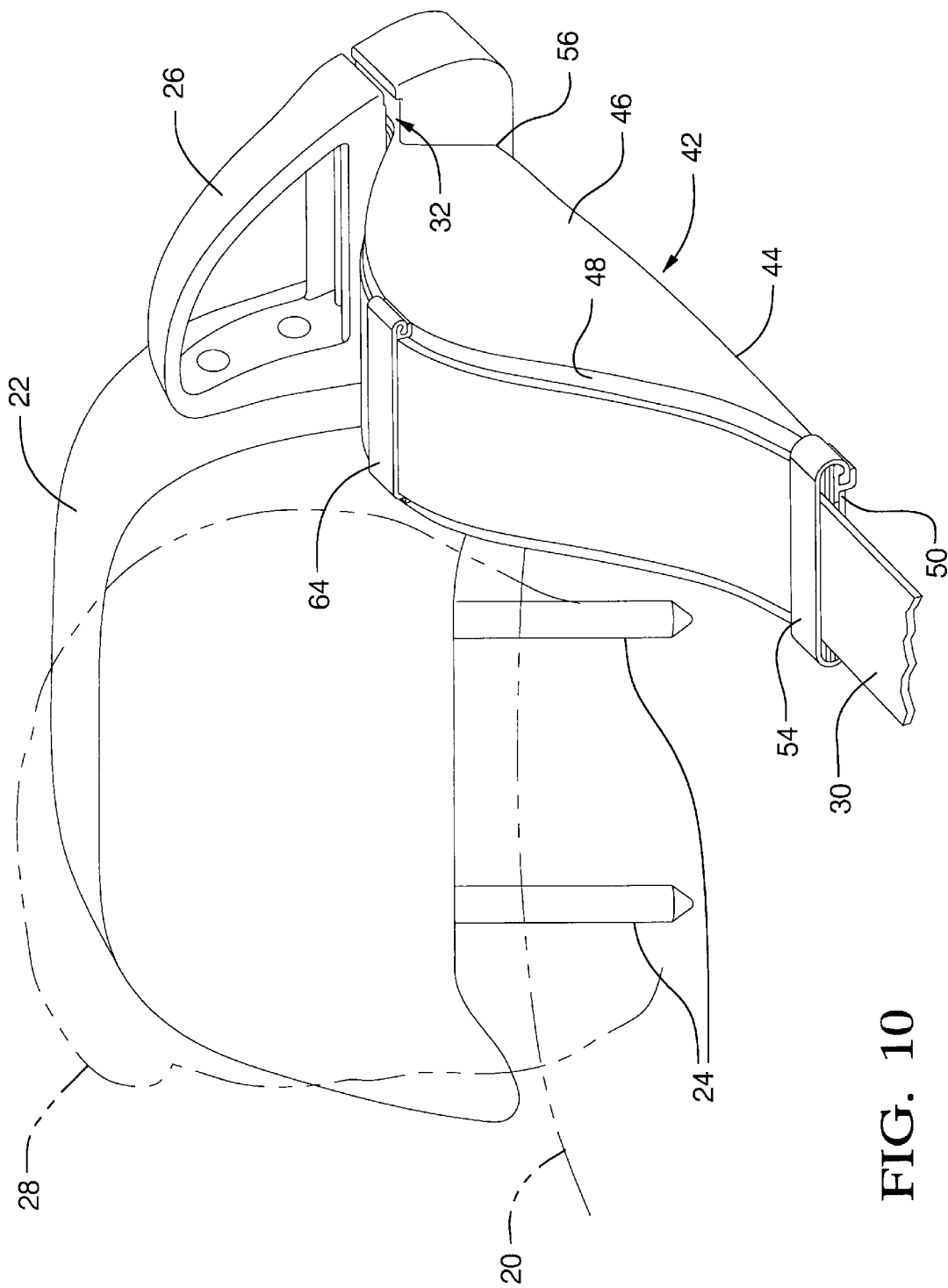
FIG. 10 is a view similar to FIG. 1, but showing the bag inflated.

Normal vehicle inflators for frontal air bags are actuated to fully inflate the bags 45–80 msec. after the threshold deceleration is detected. Inflator 40 is designed to actuate to deploy inflatable bag much more quickly, i.e. in 15–22 msec. after threshold deceleration is detected. Actuation of inflator 40 immediately thrusts clamping member 36 upwardly to clamp seat belt 30 securely against clamping surface 34, as shown in FIG. 11 to prevent any extension of seat belt 30 by the forward thrust of occupant 28. Simultaneously, bag 42 inflates to the position shown in FIG. 10. As can be seen, guide loops 54 and 64 force belt 30 to bulge upwardly with bag top surface 48.

This movement of seat belt 30 lengthens the route of seat belt 30 between the inner and outer ends 50, 52 of bag 40. The practical effect of this upward movement of belt 30 is to pretension or retract the belt 30 and secure occupant 28 firmly in seat 20 before engagement of occupant 28 with the frontal air bag (not shown). This is the primary function of inflatable bag 42. An ancillary benefit may be gained by the positioning of inflatable bag 42 along side the head of occupant 28. The deployed bag 42 may ancillarily serve as a side impact cushion, or side air bag, in the event of a vehicle side impact.

As with the frontal air bag, inflated bag 42 will gradually deflate, enabling occupant 28 to remove the seat belt 30 to exit the vehicle. Thus this invention provides a seat belt tensioner that operates to draw the seat occupant firmly into contact with the belt restraint before deployment of a frontal air bag, and ancillarily provides a side impact cushion for the occupant's head.

While only a preferred embodiment has been illustrated and described, obvious modifications thereof are contemplated within the scope of this invention and the following claims. For example inflatable bag 42 and its base 44 could be made of different materials, as could guide loops 54 and 64. Inflation times can be tailored to each specific installation.

What is claimed is:

1. A vehicle occupant seat belt installation having a seat belt movable during operation through a vehicle seat-mounted structural belt guide, characterized by a seat belt tensioner device comprising clamping means operable to clamp the belt against movement through the structural belt guide, a normally deflated inflatable bag including a body with an outer surface and a base having an inextensible fixed length with one end fixed to the structural belt guide and the other end mounting an end belt guide means embracing the belt, intermediate guide means which cooperate with the structural belt guide and the end belt guide means assure that movement of the belt is along a travel route over the outer surface of the bag a distance that is substantially equal to said fixed length when the bag is deflated, and an inflator which operates upon sensing a threshold acceleration to simultaneously operate the clamping means to immovably clamp the belt against movement and to inflate the bag to balloon the belt travel route between the ends of the bag base into a distance substantially greater than said fixed length to tension the seat belt and secure the occupant in the seat.

2. The seat belt tensioner of claim 1, further characterized by the end belt guide means comprising a belt loop, and by the intermediate guide means comprising a middle belt loop attached to the bag outer surface.

3. The seat belt tensioner of claim 2, further characterized by the clamping means including a clamping surface and a clamping member flanking the belt mounted on the structural belt guide and operable to clamp the belt against movement.

4. The seat belt tensioner of claim 1, further characterized by the seat belt including a shoulder belt portion, and by the structural belt guide being mounted on a seat back headrest, with the inflatable bag having a flexible base extending forwardly of the headrest along the shoulder belt portion thereby providing ancillary side head protection for the occupant when inflated.

5. The seat belt tensioner of claim 4, further characterized by the inflator being carried within the headrest.

6. The seat belt tensioner of claim 5, further characterized by the inflator being operable to inflate the inflatable bag within a period of 18–22 milliseconds of detection of a threshold acceleration.

* * * * *